Feb. 27, 1940.  A. L. STONE  2,191,777
METHOD OF MILLING CYLINDRICAL WORK
Filed Feb. 10, 1939  2 Sheets-Sheet 1

Inventor
Albert L. Stone.

Attorney.

Inventor
Albert L. Stone.

Attorney.

Patented Feb. 27, 1940

2,191,777

UNITED STATES PATENT OFFICE

2,191,777

METHOD OF MILLING CYLINDRICAL WORK

Albert L. Stone, Palos Verdes Estates, Calif., assignor to Hydril Company of California, Los Angeles, Calif., a corporation of California Application February 10, 1939, Serial No. 255,640

5 Claims. (Cl. 10—154)

This invention relates generally to a method for milling cylindrical work, and is more particularly concerned with a method wherein a plurality of sequential milling operations are to be performed upon a given portion of the work by a single cutting tool having zones which are adapted to be brought successively into engagement with the work at the given portion.

While the method may be applied to operations either on the outside of cylindrical work or to the inner peripheral face of tubular work, it is here shown and described by way of example in the latter situation, only, though this showing and description is not intended to be limitative on the claims except where so specifically indicated.

Also by way of example, and therefore not limitatively, I have shown only two cutting zones on the cutter, one of them being in the nature of a blanking cutter and the other as a follow-up thread milling cutter. The method is shown as being applied to the blanking and thread milling of pipe such as used for drill strings or well casing, as representing a situation where the invention may be applied with particular advantage, though it is not intended to infer that the invention or the appended claims are limited thereto. However, by way of example, the difficulties encountered in performing threading operations on this particular type of work lend themselves particularly well to the pointing out of certain advantages gained by the employment of my improved method.

Take, for instance, a situation where a well pipe having given bore, must first be counterbored and then threaded within that counterbore. Once the pipe, which is inherently heavy and awkward to handle, has been chucked in a lathe or the like (and accurate chucking of such work is relatively difficult of accomplishment) it is highly desirable, for obvious reasons, that both the counterboring and threading be done without re-chucking the work. If there is to be no re-chucking between operations, this means that a single machine must be used to hold the work during both operations. With such a condition prevailing, ordinarily two different tools, one for counterboring and the other for threading, must be set up in the machine. In usual practice this requires that either the two tools must be mounted upon a shiftable head, such as a turret, for sequential presentation to the work, or that the first tool be mounted in the machine and, after it has done its work, removed from the operating spindle and replaced by the second tool, which thereupon does its work. There are thus either involved the complications, inaccuracies and expense of the turret head type of machine, or the relative slow practice of tool replacement with the attendant danger that the setting of one tool may not correspond accurately with the setting of the other.

I have avoided these complications by the evolvement of a method whereby there need be but a single chucking of the work and but a single setting-up of the tool. This is conducive to speed, accuracy, and economy, as will be readily understood. The method involves the use of a single tool having a plurality of cutting zones, each zone having its individual cutting characteristics. The zones are so related that their operations may be performed sequentially without changing the setting of the tool and without having the idle zones affecting the cutting operation of the active zones.

The cutting zones are thus permanently and definitely maintained in the proper relative position and have a common axis of rotation, so, with a single tool-setting, they may be brought accurately into working position so that the work performed by one will be accurately co-ordinated with the work performed by the other.

Further objects and features of novelty of the invention will be made apparent in the following detailed description wherein.

Figure 1:
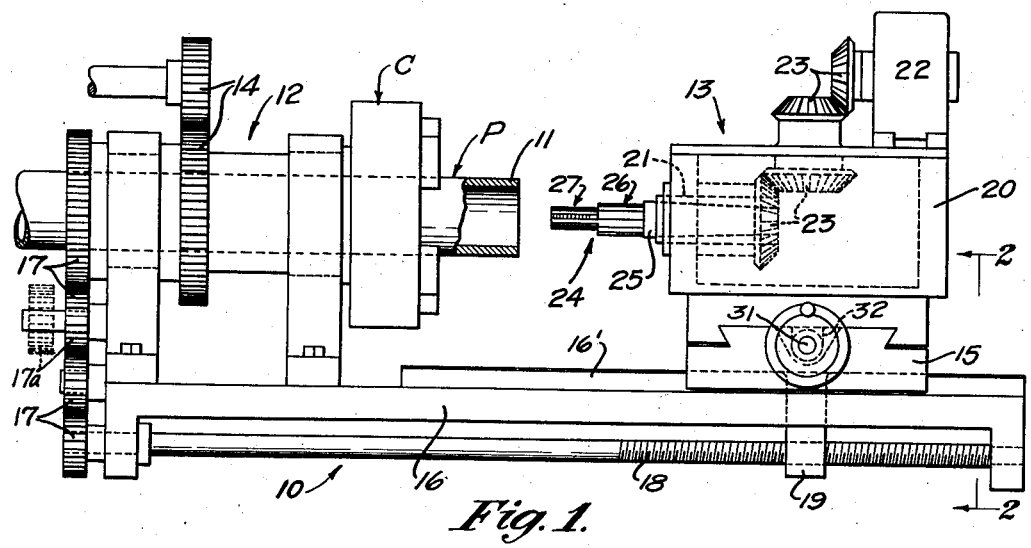
Fig. 1 illustrates conventionally a machine adapted to carry out my improved method.

In Fig. 1, I have illustrated conventionally a machine generally indicated at 10 adapted to carry out my improved method. In the illustrated case, the work is in the form of a pipe P whose end 11 is to be counterbored and then threaded within the counterbore. The machine 10 is in the general nature of a lathe, the tubular work head being indicated generally at 12 and the tool head at 13. Head 12 is adapted to be driven as, for instance, by gear train 14, while the carriage 15 of the head 13 is slidable longitudinally over the ways 16' of bed 16 toward or away from head 12. Declutchable gear train 17 is adapted to drive feed screw 18 which has threaded engagement with carriage extension 19 whereby, when the gear train is in operative condition, carriage 15 is moved longitudinally of the lathe bed in timed relation with the angular velocity of head 12 and the work chucked therein by chuck C. While train 17 may be declutched as by shifting one of its gears 17a to the dotted line position and thus out of mesh with the rest of the train, it will be understood that this showing is purely illustrative and any other means may be employed for interrupting and re-establishing the drive between head 12 and carriage 15.

Figure 4:
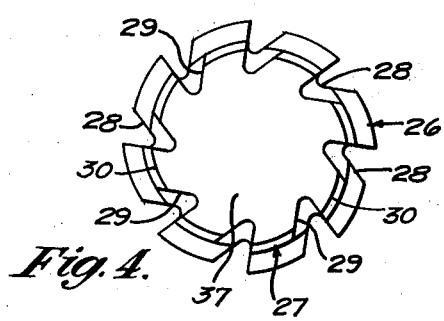
Fig. 4 is an end elevation of the tool shown in Fig. 3, as viewed from the position of arrow 4.
Figure 2:
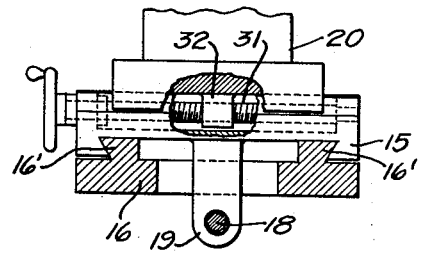
Fig. 2 is a fragmentary section on line 2—2 of Fig. 1.

Mounted on carriage 15 for movement transversely of the lathe bed, is a head 20 having a spindle 21 mounted for rotation therein, the axis of rotation being normally parallel to the axis of rotation of head 12 and hence of work P. The spindle 21 may be rotated by any desired mechanism, though here, for illustrative purposes, it is shown as being driven from motor 22 on head 20, through gear train 23. Coaxially mounted in spindle 21 is a tool, typified generally as a circular cutter 24, having a shank 25 for connection with spindle 21 (as by a tapered socket, not shown) and two coaxial and preferably integral, cutting portions 26 and 27 which may be considered as individual cutting zones. Portion 26 is of relatively large diameter and is fluted as clearly indicated at 28 in Fig. 4 to give it the characteristics of a blanking mill; while portion 27 is of relatively small diameter and is fluted at 29 and serrated at 30 between its flutes to give it the characteristics of a thread mill or hob.

Figure 3:
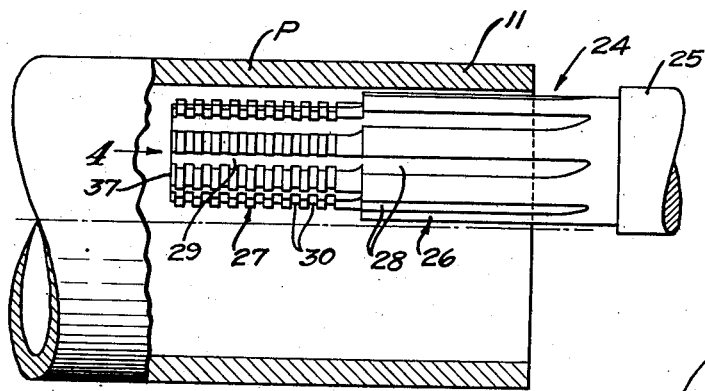
Fig. 3 illustrates the relative position of the work and tool when starting to proceed according to my method.

After accurately chucking work P within head 12, carriage 15 is advanced to the left in Fig. 1 (either by way of lead screw 18 or, preferably, through a rapid-traverse arrangement, not shown) until it occupies the position shown in Fig. 3. Of course, at the time of this advance, tool 24 may be coaxial with the work or axially off-set with respect to the work axis to a greater or less extent than that shown, but in any event, when it reaches the position of Fig. 3 it will be substantially axially parallel with the work and will be clear of the inner peripheral face of the work.

Figure 5:
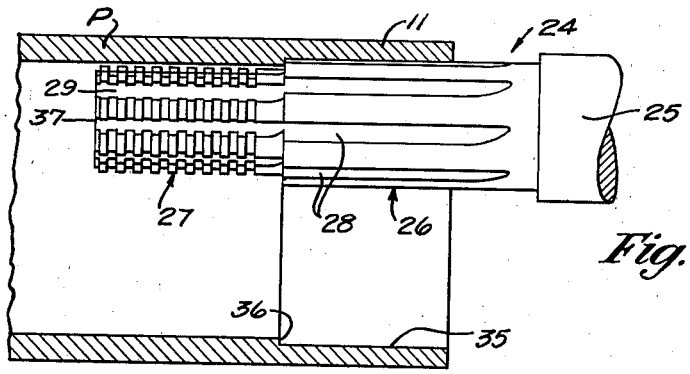
Figs. 5, 6, 7 and 8 illustrate sequential steps in carrying out my method.

With the work now rotating relatively slowly and with the tool rotating relatively rapidly, cross-feed screw 31 is operated to act on head-nut 32 in a manner to feed head 20 transversely of bed 16 and thus carry cutter 26 into cutting engagement with the inner peripheral face of the pipe, the cross-feed preferably being accomplished in a manner to give the tool a "plunge-cut" to full predetermined depth. In its new position (Fig. 5) blanking mill 26 will, of course, remain with its axis of rotation parallel to the axis of rotation of the work, and threading mill 27 is of sufficiently smaller diameter that, with blanking mill 26 plunged to full depth, the threading mill will not engage the work.

The above operation is continued until the pipe has made at least one complete revolution, it resulting that the pipe finally has formed in the end thereof a counterbore 35, the counterbore being defined at its inner end by annular shoulder 36 while the outer end of the counterbore opens to the extreme end of the pipe.

Figure 6:
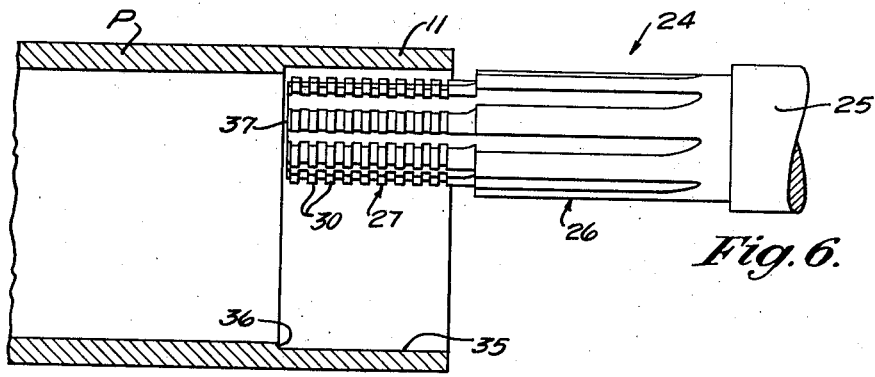
Figure 7:
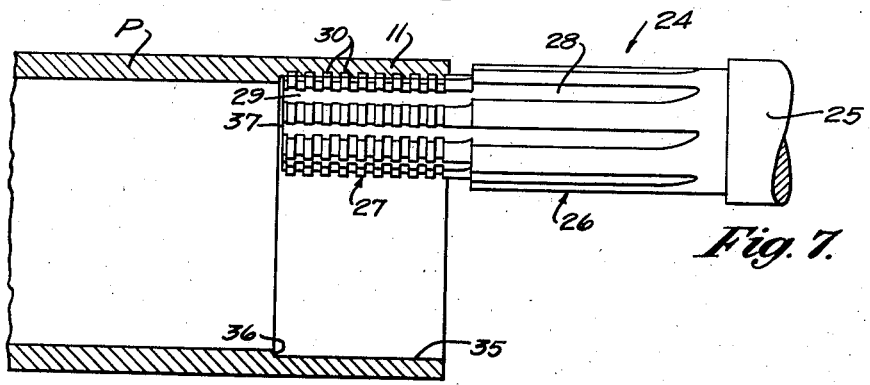

Carriage 15 is then shifted to the right a sufficient distance (see Fig. 6) to clear blanking mill 26 from the pipe and to bring threading mill 27 into radial opposition with the wall of counterbore 35, the free end 37 of mill 27 being positioned opposite the point where the thread is to start in the counterbore. With the work and tool now rotating, head 20 is moved transversely with respect to the lathe bed by actuation of cross feed 31—32 to give threading mill 27 a plunge cut to depth into the defining wall of counterbore 35 (Fig. 7).

Figure 8:
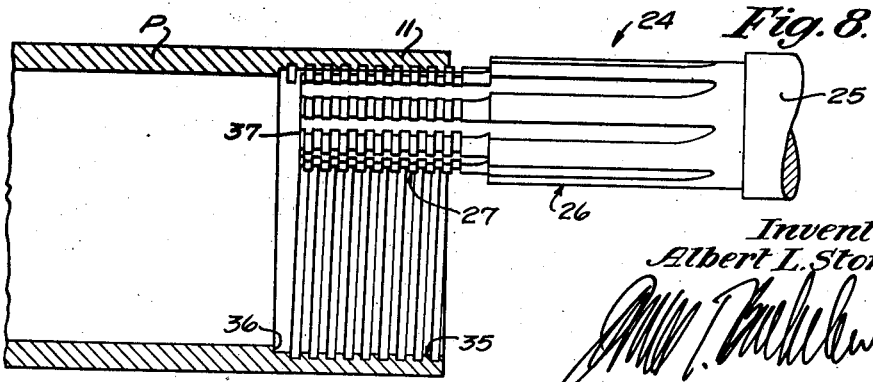

Substantially simultaneously with the taking of this plunge-cut, the drive from head 12 through gear train 17 and feed screw 18 is established, it resulting that as the work rotates to constantly present uncut material to the cutter, the cutter is being fed slowly to the right toward the position of Fig. 8. The drive connection between the work head and carriage 15 is such that during one revolution of the work the tool is fed to the right a distance equal to the lead of the thread being cut and as represented by the lead of the teeth on the thread miller. This last operation is continued until the work has made at least one complete revolution, although preferably it is continued slightly longer so it may be assured that there will be an overlap at the beginning end of the cut thus eliminating any unevenness or extra stock left adjacent the starting point of the cut. Thus, with but a rotation of 360°+ of the work, a complete thread has been milled, as indicated in Fig. 8.

The carriage 15 may then be shifted transversely in a manner to clear the mill 27 from the cut thread and then shifted longitudinally in a manner to clear tool 24 entirely from the work, whereupon the machine is ready for the introduction of a new pipe and a repetition of the cycle just described.

It will be seen from the above, that with a single chucking of the work and with a single setting of tool 24 it is possible to sequentially counter-bore the pipe and internally thread that counterbore with ease, dispatch and accuracy, rendering the entire operation one of simplicity, yet of full accuracy, and thus representing great economic advantage over the methods heretofore employed.

It will be understood that while I have shown the method as applied to work of a given character, the showing is not to be considered as limiting the scope of the invention or of the appended claims, nor are the invention or claims to be considered as limited to the illustrated nature of the milling operations performed, except as to those claims which specifically set them forth.

I claim:

1. The method of milling cylindrical work with a circular cutter having a plurality of longitudinally extending, axially alined cutting zones of different diameters spaced longitudinally therealong, that includes rotating the work and cutter about substantially parallel axes with one of the cutter zones opposite the work at the point to be milled, moving the cutter transversely with respect to the work to bring said one zone into cutting engagement with a peripheral face of the work, continuing such rotation until the work has completed at least one revolution, relatively longitudinally shifting the cutter and the work to clear said one zone from and to bring another zone into radial opposition with the work at the point where it has been cut, moving the cutter transversely with respect to the work to bring said other zone into cutting engagement with the work at said point, rotating the work and cutter, and continuing such engagement until the work has completed at least one revolution.

2. The method of milling cylindrical work with a circular cutter having a plurality of longitudinally extending, axially alined cutting zones of different diameters spaced longitudinally therealong, that includes rotating the work and cutter about substantially parallel axes with a relatively large-diameter zone opposite the work at the point to be milled, moving the cutter transversely with respect to the work to bring said large-diameter zone into cutting engagement with a peripheral face of the work, continuing such rotation until the work has completed at least one revolution, relatively longitudinally shifting the cutter and the work to clear said large-diameter zone from and to bring a relatively small-diameter zone into radial opposition with the work at the point where it has been cut, moving the cutter transversely with respect to the work to bring said small-diameter zone into cutting engagement with the work at said point, rotating the work and cutter, and continuing such engagement until the work has completed at least one revolution.

3. The method of milling the inside of tubular cylindrical work with a circular cutter having a plurality of longitudinally extending, axially alined cutting zones of different diameters spaced longitudinally therealong, that includes rotating the work and cutter about substantially parallel axes with the cutter within the work bore and with one of the cutter zones opposite the work at the point to be milled, moving the cutter radially outward with respect to the work to bring said one zone into cutting engagement with a peripheral face of the work, continuing such rotation until the work has completed at least one revolution, relatively longitudinally shifting the cutter and the work to clear said one zone from and to bring another zone into radial opposition with the work at the point where it has been cut, moving the cutter radially outward with respect to the work to bring said other zone into cutting engagement with the work at said point, rotating the work and cutter, and continuing such engagement until the work has completed at least one revolution.

4. The method of milling the peripheral face at one end of cylindrical work with a circular cutter having a plurality of longitudinally extending, axially alined cutting zones of different diameters spaced longitudinally therealong, that includes rotating the work and cutter about substantially parallel axes with one of the cutter zones opposite the work at the point to be milled, moving the cutter transversely with respect to the work to bring said one zone into cutting engagement with a peripheral face of the work, continuing such rotation until the work has completed at least one revolution, relatively longitudinally shifting the cutter and the work to clear said one zone from the end of the work and to bring another zone into radial composition with the work at the point where it has been cut, moving the cutter transversely with respect to the work to bring said other zone into cutting engagement with the work at said point, rotating the work and cutter, and continuing such engagement until the work has completed at least one revolution.

5. The method of blanking and threading cylindrical work with a circular cutter having a plurality of axially alined cutting zones of different diameters spaced longitudinally therealong, one of the zones being a blanking mill and the other zone being a threading mill, that includes rotating the work and cutter about substantially parallel axes with the blanking mill opposite the work at the point to be cut, relatively transversely moving the cutter and the work to bring said blanking mill into cutting engagement with a peripheral face of the work, continuing such rotation until the work has completed at least one revolution, relatively longitudinally shifting the cutter and the work to clear said blanking mill from and to bring said threading mill into radial opposition with the work at the point where it has been cut, relatively transversely moving the cutter and the work to bring said threading mill into cutting engagement with the work at said point, rotating the work and cutter and simultaneously relatively longitudinally moving the work and cutter in timed relation to the angular velocity of the work, and continuing the threading mill in cutting engagement until the work has completed at least one revolution.

ALBERT L. STONE.

CERTIFICATE OF CORRECTION.

Patent No. 2,191,777.                                    February 27, 1940.

ALBERT L. STONE.

It is hereby certified that error appears in the printed specification of the above numbered patent requiring correction as follows: Page 3, second column, line 15, claim 4, for the word "composition" read opposition; and that the said Letters Patent should be read with this correction therein that the same may conform to the record of the case in the Patent Office.

Signed and sealed this 30th day of April, A. D. 1940.

(Seal)

Henry Van Arsdale,
Acting Commissioner of Patents.